Oct. 21, 1969     L. M. NOSEWORTHY     3,473,239

EXERCISE PERFORMANCE AND RECORDING DEVICE

Filed Sept. 14, 1967

INVENTOR.

LLOYD M. NOSEWORTHY

ATTORNEY

United States Patent Office 3,473,239
Patented Oct. 21, 1969

3,473,239
EXERCISE PERFORMANCE AND RECORDING DEVICE
Lloyd M. Noseworthy, Lincoln Park, Mich.
(43 W. Macada Road, Bethlehem, Pa. 18017)
Filed Sept. 14, 1967, Ser. No. 667,723
Int. Cl. G09b 19/00
U.S. Cl. 35—21     5 Claims

ABSTRACT OF THE DISCLOSURE

A device for stimulating the performance of and for recording exercises of the human body is described. The device provides a visual stimulant to prompt a person to continue an exercise program. The device comprises a chart and exercise indicating pieces which are used with the chart. The exercise indicating piece comprises a simulated human figure in an exercise position and a counter to record the number of repetitions of the exercise represented by the simulated human figure.

BACKGROUND OF THE INVENTION

Books and other written material are available which describe exercises which can be performed by a person in order to maintain or improve his physical well being. The information contained in these books and other written material teaches a person how to perform the exercises, what their effect is and provides exercise programs to fit individual needs. Simple charts are also available to be used to record the exercises and to indicate the person's progress in his program. However, available charts and exercise systems do not provide any direct, constant stimulus to the person to continue his exercise program.

Thus, a visual stimulant and recording device which would serve as a self-reminder to a person on an exercise program would be a valuable contribution to the art. The present invention provides such a contribution.

SUMMARY OF THE INVENTION

An exercise performance and recording device comprising
(1) Exercise indicating pieces, each of said pieces comprising a rigid member having attached thereto, on the same side,
  (a) A simulated human figure in an exercise position, and
  (b) A rotatable counter, said counter having numerals thereon serving to indicate the number of repetitions of the exercise demonstrated by said simulated figure, and
(2) A chart having thereon a plurality of blocks arranged in aligned rows and columns, each of said blocks serving to receive one of said exercise indicating pieces and each of said rows of blocks serving to indicate an interval of time.

BRIEF DESCRIPTION OF THE DRAWINGS

In order to illustrate the device of my invention, drawings of an embodiment are provided. These drawings, it is understood, illustrate but do not limit the device of my invention.

DESCRIPTION OF THE PREFERRED EMBODIMENTS

An embodiment of this invention is an exercise performance and recording device comprising a chart and exercise indicating pieces to be used on said chart, said pieces comprising a rigid member having attached thereto, on one side, a simulated human figure in an exercise position and a rotatable counter serving to indicate the number of repetitions of the exercise demonstrated by said simulated figure. Another embodiment of this invention is said exercise performance and recording device wherein said chart has a plurality of blocks aligned in rows and columns, each column of blocks serving to receive said exercise pieces and each row of blocks serving to indicate a period of time.

A preferred embodiment is a device as described above wherein said chart is mounted on a container cover, said container serving to store said exercise indicating pieces.

Another embodiment of this invention is said exercise indicating piece comprising a rigid member having positioned thereon
  (a) A simulated human figure in an exercise position, and
  (b) A rotatable counter which serves to indicate the number of repetitions of the exercise illustrated by said simulated figure.

These and other embodiments of this invention will be made clear by the drawings, description and claims herein contained.

Figure 1:
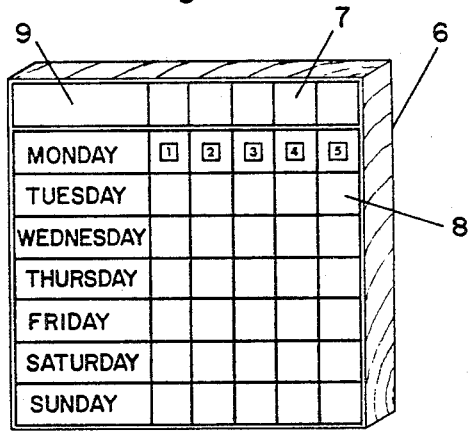
FIGURE 1 is a front elevational view of the device of the present invention. The squares marked 1 through 5 in FIGURE 1 represent exercise indicating pieces.

Referring to FIGURE 1, an embodiment of the present invention is illustrated. The chart in FIGURE 1 has been designated 6. The square containing the numbers 1 through 5 in FIGURE 1 represent exercise indicating pieces as illustrated by FIGURES 2 and 3.

As shown in FIGURE 1, the chart 6 may be either a rigid or flexible sheet made from a suitable material such as paper, wood, a thermoplastic or thermoset polymeric material, metal, rubber, glass, a combination of these materials, and the like. The chart 6 in FIGURE 1 is rigid and of wood. In the event the chart is of flexible material, it may be mounted on a rigid base. The chart may also conveniently be mounted on or be an integral part of the top of a container, said container serving to store the exercise indicating pieces. Although the chart 6 is rectangular in shape, it is not limited to this shape and may conveniently be any shape which is desired as, for example, square, circular, triangular, and the like.

In any event, the chart 6 has a plurality of blocks 7 and 8 in aligned rows and columns. The first column 9 has blocks larger than the remaining blocks which are all the same size. This arrangement is provided so that a period of time such as a day of week may be indicated in the first column 9. The remaining blocks, e.g., 7 and 8, are of a size proper to receive the exercise indicating pieces, illustrated by FIGURES 2 and 3. FIGURE 1 shows six columns and six rows. More or less rows and columns can be used on the chart 6 depending on the time periods and number of exercises chosen.

Figure 2:
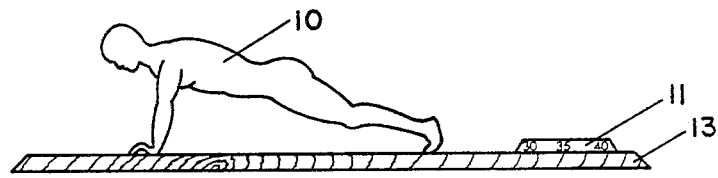
FIGURE 2 is a side elevational view of an exercise indicating piece, illustrating the "push-up" exercise position.
Figure 3:
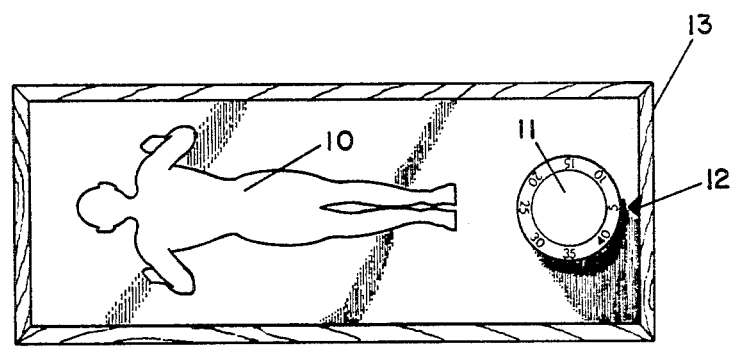
FIGURE 3 is a top elevational view of the exercise indicating piece of FIGURE 2.

An exercise indicating piece is illustrated in more detail in FIGURES 2 and 3. The exercise position illustrated by the simulated human figure 10 in FIGURES 2 and 3 is the "Push-Up." Other exercise positions such as the "Sit-Up," "Touch Toes," and the like, may also be illustrated in other exercise pieces. The simulated human figure 10 may be constructed of any suitable material. It can be constructed conveniently from material which is readily bent and/or shaped. The figure may likewise be molded or formed in the desired shape using a readily formable material such as polyethylene, polystyrene, rubber, glass, lead, wax, papier-mache, wood, metal wire, and the like.

The rotatable counter 11 has numerals on it and a pointer 12 is positioned on the rigid member 13. The counter 11 and pointer 12 serve to indicate the number of repetitions of the exercise illustrated by the simulated human figure 10. As with the simulated figure 10, the rotatable counter 11 may be made of any suitable material; and it may be mounted by any suitable means such as a pin on the rigid member 13. Thus, the counter 11 may be made of readily formable material such as polyethylene, polystyrene, rubber, lead, wood, glass, and the like. The counter 11 may likewise be made of the readily formable materials disclosed above. As shown in FIGURES 2 and 3, said rotatable counter 11 is mounted on the same side of the rigid member 13 as said simulated figure 10. Said rotatable counter 11 can be positioned on any side of said rigid member 13, except the side which is directly opposed to the side on which said simulated figure 10 is positioned. Regarding said rigid member 13 on which the simulated figure 10 and the rotatable counter 11 are mounted, this may be made of any suitable rigid material. For example, said rigid member 13 may be made of wood, metal, glass, thermoplastic or thermoset polymeric material, rigid foam, and the like. The entire exercise indicating piece illustrated in FIGURES 2 and 3 might also be quite conveniently molded as one integral unit, as for example, by injection molding a suitable thermoplastic material.

The exercise performance and recording device of my invention may be used in the following manner. A person who wants to become more physically fit sets a particular goal to achieve and decides on an exercise program. Let us say he selects the exercises commonly known as "Push-Up" and "Sit-Up" to be performed daily. He then places his exercise performance chart in a convenient location in his home, office, or place of business. He then takes the exercise indicating pieces for the "Push-Up" and the "Sit-Up," sets the rotatable counter to the number of repetitions he will perform each day, and then he places the "Push-Up' and "Sit-Up" pieces on the chart in the top row of blocks in the second and third columns. Thus, on Monday, after he completes the number of repetitions of each exercise he has set on the exercise indicating piece counters, he moves the pieces to the blocks in the row marked Monday; and so on through the week. The following week he can increase the number of repetitions of the exercises as he progresses in his program; he can add other exercises as he progresses also. As pointed out above, the advantage the present exercise performance and recording device offers is that it provides a direct, visual stimulus to do the exercises, reminds the person how many repetitions of each exercise he has performed on the previous day, and encourages the person to continue his exercise program. Without this stimulus and reminder, a person would have little incentive to continue and complete his exercise program.

The present invention has been described above. This invention is to be limited only within the spirit and lawful scope of the following claims.

I claim:
1. An exercise performance and recording device which acts as a visual stimulant and reminder to a person on an exercise program, comprising
  (1) exercise indicating pieces, each comprising a rigid member having positioned thereon
    (a) a simulated human figure in an exercise position, and
    (b) a rotatable counter, said counter having numerals thereon serving to indicate the number of repetitions of the exercise demonstrated by said simulated figure, and
  (2) a chart having thereon a plurality of blocks aligned in rows and columns, each of said blocks serving to receive one of said exercise indicating pieces and each of said rows of blocks serving to indicate an interval of time.

2. An exercise performance and recording device of claim 1 wherein said simulated figure and said rotatable counter are on one side of said rigid member.

3. An exercise performance and recording device of claim 1 wherein said chart is an integral part of a container cover, said container serving to store said exercise indicator pieces.

4. An exercise indicating piece comprising a rigid member having positioned thereon
  (a) a simulated human figure in an exercise position, and
  (b) a rotatable counter which serves to indicate the number of repetitions of the exercise illustrated by said simulated figure, said rotatable counter being on the same side of said rigid member.

5. A method of recording the progress of exercises performed by a person in an exercise program which comprises:
  (1) selecting at least one exercise indicating piece of claim 1,
  (2) setting said rotatable counter on said exercise indicating piece to indicate the number of exercise repetitions,
  (3) placing said exercise indicating piece on the chart of claim 1 in a block in the uppermost row,
  (4) performing the exercise as illustrated by said exercise indicating piece for the number of repetitions indicated by said counter,
  (5) moving said exercise indicating piece vertically down and column of blocks at the rate of one block for each exercise performed according to the schedule of (4) above, for each interval of time indicated by each row on said chart,
whereby the progress of said exercise program is recorded.

References Cited

UNITED STATES PATENTS

| | | | |
|---|---|---|---|
| 2,965,978 | 12/1960 | Olson | 35—23 |
| 3,035,355 | 5/1962 | Holmes | 35—23 |
| 3,310,308 | 3/1967 | Reagan | 235—83 X |

LAWRENCE CHARLES, Primary Examiner